United States Patent [19]

Zerlauth

[11] 4,003,200
[45] Jan. 18, 1977

[54] METHOD AND APPARATUS FOR COOLING TURBOMACHINES

[75] Inventor: Ferdinand Zerlauth, Andelfingen, Switzerland

[73] Assignee: Brown Boveri-Sulzer Turbomachinery, Ltd., Zurich, Switzerland

[22] Filed: July 14, 1925

[21] Appl. No.: 595,490

Related U.S. Application Data

[63] Continuation of Ser. No. 416,685, Nov. 16, 1973, abandoned.

[30] Foreign Application Priority Data

Nov. 17, 1972 Switzerland .................... 16576/72

[52] U.S. Cl. .......................... 60/39.02; 60/39.09 R
[51] Int. Cl.² .......................................... F02C 7/00
[58] Field of Search ........ 60/39.09 R, 39.14, 39.13, 60/39.15, 39.02, 39.1, 39.29

[56] References Cited

UNITED STATES PATENTS

| | | | |
|---|---|---|---|
| 2,365,551 | 12/1944 | Hermitto | 60/39.14 |
| 2,617,253 | 11/1952 | Fusher | 60/39.02 |

*Primary Examiner*—Carlton R. Croyle
*Assistant Examiner*—L. J. Casaregola
*Attorney, Agent, or Firm*—Kenyon & Kenyon Reilly Carr & Chapin

[57] ABSTRACT

An auxiliary blower is connected to the gaseous supply line to the axial compressor to deliver a gaseous medium, such as air, under pressure to the compressor when the rotor has been shut-off and slowed to a reduced speed. The delivered gaseous medium allows the rotor to continue rotating at the reduced speed while cooling of the rotor and vanes takes place in a uniform manner. The drive power for the blower amounts to 0.05% to 0.1% of the useful power in full-load operation of the compressor.

8 Claims, 5 Drawing Figures

METHOD AND APPARATUS FOR COOLING TURBOMACHINES

This is a continuation of application Ser. No. 416,685 filed Nov. 16, 1973, now abandoned.

This invention relates to a method and apparatus for cooling turbomachines.

As is known, turbomachines having at least one axial turbocompressor, and possibly other interconnected turbomachines, frequently operate at high temperatures. Should these highly heated thermal turbomachines be shut-off, the various parts such as the rotors and stator begin to cool. However, if the cooling is not uniform and symmetrical, the resulting variations in temperature conditions can cause stresses which produce warping of the rotor and stator. The resultant bends in these parts would then remain for a substantial time until complete temperature equilization is achieved. A danger therefore exists during this cooling-off period that the parts can become stripped or otherwise damaged if the turbomachine is restarted. In order to avoid this, the turbomachines have sometimes been allowed to remain out of commission for extended cooling-off periods. In other cases, the non-symmetrical cooling down of these turbomachines has been counteracted by rotating the rotors during their rundown period at a slow speed by means of an auxiliary motor. However, these motors must be switched on and off via couplings. Thus, taken as a whole, an expensive auxiliary unit is produced. In addition, such units are also liable to derangements.

Accordingly, it is an object of the invention to cool down a turbomachine in a uniform symmetrical manner.

It is another object of the invention to effect cooling of an axial turbocompressor in an inexpensive manner.

It is another object of the invention to utilize a turbomachine itself for slowly turning a rotor therein to effect a uniform cooling of the turbomachine during shut-down.

It is another object of the invention to reduce the cooling down periods of turbomachines.

It is another object of the invention to allow for restarting of a turbomachine a short time after shut-down.

Briefly, the invention provides a method and apparatus in which a turbomachine, such as a turbocompressor, having a rotor, which may be coupled to other rotors, and vanes is used itself to slow the rotor.

In accordance with the method, after initiation of the shut-off process, the rotor is allowed to slow down while making use of inherent kinetic energy until a reduced speed is reached in the region of a suitable cooling speed. Thereafter, a flow of gaseous medium is passed through the flow path of the turbomachine to maintain the rotor at the reduced speed until the rotor has cooled to a predetermined temperature.

In accordance with the apparatus of the invention, an auxiliary blower is connected to a supply line which normally delivers a gaseous medium to a flow path in the turbomachine. This blower serves to deliver a flow of pressurized gaseous medium, such as air or some other gas, to the turbomachine flow path for driving the rotor at the reduced rotary speed.

Where the turbocompressor is connected in line with a combustion chamber and gas turbine having a rotor coupled to the compressor rotor, the supplied driving medium impinges on the convex surfaces of the compressor vanes and the concave surfaces of the turbine vanes. In spite of the unfavorable flow conditions at the compressor vanes, the supplied driving medium produces sufficient torque at the turbo-rotor to keep the rotors of both machines at the reduced rotary speed. The flow conditions for the turbine vanes are more favorable because the compressed air flows over concave surfaces. Therefore, in the case of these types of gas-turbine installations, there is an alleviation of the drawback which resides in the volume, and thus also the speed of flow of the driving medium flowing through the compressor (because there is no longer heating in the combustion chamber), being too small for the flow-section of the turbine to make efficient use of the flow energy of the driving medium at the rotor vanes where the flow energy is converted into drive energy.

In connecting the auxiliary blower to the supply line, use is made of a shut-off means in the supply line to close the supply with respect to the turbocompressor. The shut-off means can be of any suitable construction such as of the multi-slatted shutter type or of the Venetian blind type. In this case, a duct containing the blower is connected to the supply line downstream of the blower. This duct can also be connected to the supply line upstream of the shut-off means to by-pass the gaseous medium around the shut-off means and through the blower to the turbocompressor.

Surprisingly, it has been found that ordinary blowers may be used to maintain the reduced speed of the rotor with their performance being in the region of 0.05% to 0.1% of the full load of the turbomachine to be cooled. In order to drive the blower, electromotors of the simplest type suffice, even though they may not be of maximum efficiency, because they operated only a relatively short time and at relatively low performance.

These and other objects and advantages of the invention will become more apparent from the following detailed description and appended claims taken in conjunction with the accompanying drawings in which:

Figure 1:
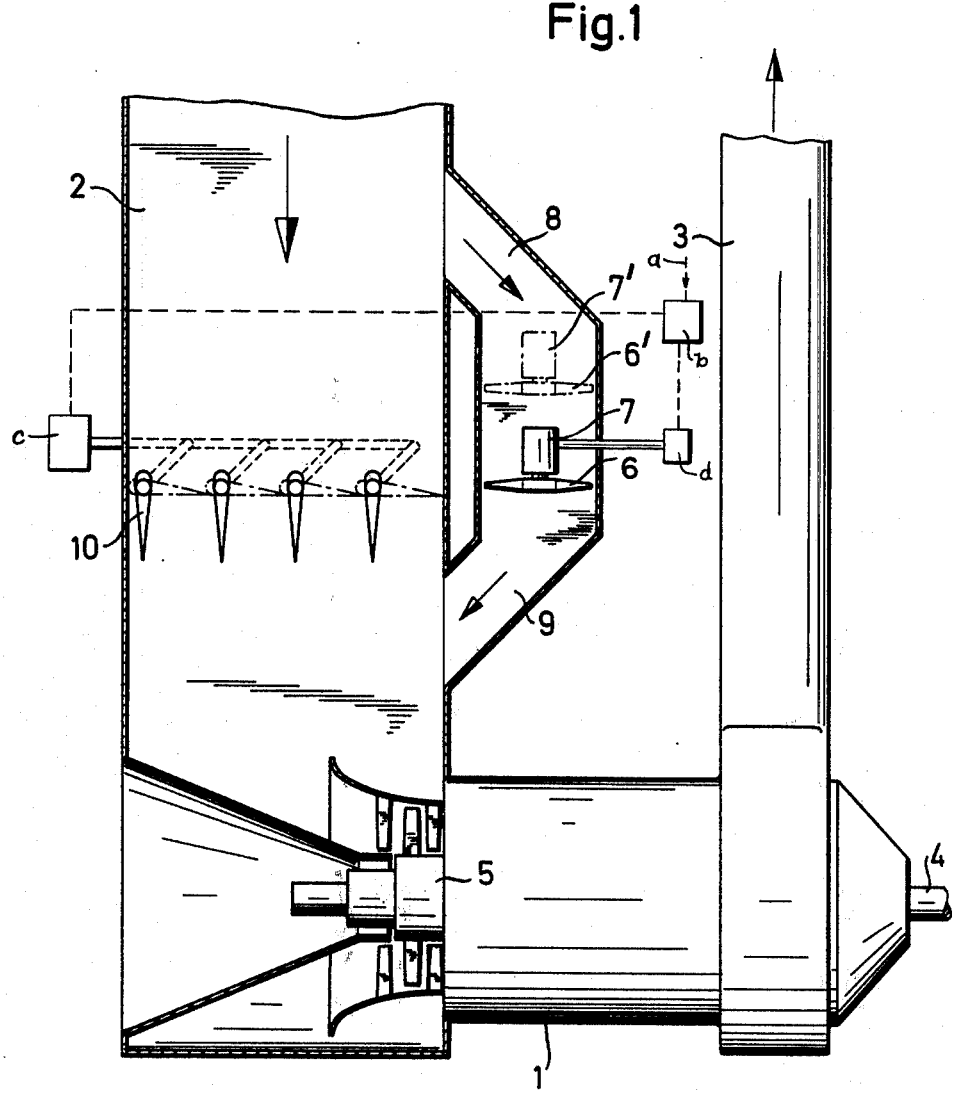
FIG. 1 illustrates a view of a turbomachine installation according to the invention having one turbomachine.

Referring to FIG. 1, the turbomachine 1 is made as a compressor to which air or some other gas is supplied through a supply line 2. The compressed gas flows through a line 3 to a consumer (not shown). The compressor 1 is driven by a power machine (not shown) that is coupled to a shaft end 4 of the rotor 5 of the compressor 1. An auxiliary blower 6 which is driven by a drive motor 7 is located in a by-pass duct 8, 9 connected to the supply line 2. This blower 6 serves to blow a flow of pressurized gaseous medium into the supply line 2 upstream of the compressor 1, the gaseous medium being taken from the upper reaches of the supply line 2. In order to prevent a short-circuit flow, a shutter-like Venetian-blind type of shut-off means is disposed in the line 2 between the connections of the duct 8, 9. In case a single blower 6 is not sufficient, a second blower 6' may be set before or behind the first blower 6 with a corresponding drive motor 7'.

In operation, in order to shut off the turbomachine 1, the supply of energy to the shaft 4 is terminated. The rotor 5 is then allowed to slow using its inherent kinetic energy, until the rotor speed falls into a region of a speed suitable for cooling. At this time, through suitable sensing and switching means, the auxiliary blower 6 is activated via the motor 7 in order to blow gaseous medium into the compressor 1 to maintain the reduced speed of the rotor 5. As shown in FIG. 1, the sensing and switching means includes a control means $b$ of known construction which receives a control signal $a$ and in response delivers a signal to a switch $d$ to activate the blower motor 7 while simultaneously delivering a signal to the means $c$ for moving the shut-off means 10 to the dotted line position. Through this, the compressor 1 is kept at the reduced speed until the temperature has dropped sufficiently. The cooling effect also becomes accelerated by the flow-through of the driving medium serving to maintain the cooling speed. During activation of the blower 6, the shut-off means 10 is set in the position shown by dotted lines via suitable means. As shown, the duct 9 is uninterrupted between the blower 6 and supply line 2 to deliver the total flow of pressurized gaseous medium from the blower 6 to the supply line 2.

The drive power for the auxiliary blower 6 amounts to about 0.05% to 0.1% of the useful power in the full-load operation of the compressor 1; and the overpressure for maintaining the decreased rotary speed amounts to approximately 0.01 to 0.04 atmosphere. The air forwarded by the blower 6 allows a uniform cooling down of the rotor 5 to occur. In addition, because of the turbulence of the cooling medium, the stator and associated vanes likewise become cooled uniformly.

By setting the cooling speed of the rotor 1 at a suitable value, it is possible, at any time during the slowing down of the machine, to set the machine into operation and without having to fear damage, such as stripping of the blades.

Referring to FIGS. 2 to 5, the invention can be used in a turbomachines group consisting essentially of a compressor 11, a combustion chamber 12 and a gas turbine 13. The group is constructed so that air flows to the installation from a supply line or duct 14, is compressed by the compressor 11 to the combustion temperature and is brought in the combustion chamber 12 to the necessary temperature as is known. The resultant driving gas expands in the gas turbine 13 while delivering power. A portion of this power is conducted to the compressor 11. The remaining part serves as usable power and is carried onward by means of a coupling 15 to other machines (not shown).

In order to take the turbomachine group out of operation, after interrupting the firing of the combustion chamber 12, the rotors of the turbomachines 11 and 13 and of the machines driven thereby are slowed down while utilizing their inherent kinetic energy, until their speed is in the region suitable for the cooling. In order to maintain this reduced speed, air is sent through the flow-path defined by ducts 17, 18, 19 under pressure as a driving medium by means of an auxiliary blower 16. In this way, the turbomachine group is kept at the cooling speed until the temperature of the group has dropped sufficiently. The cooling is thus accelerated and kept uniform by the driving air flowing through.

Figure 2:
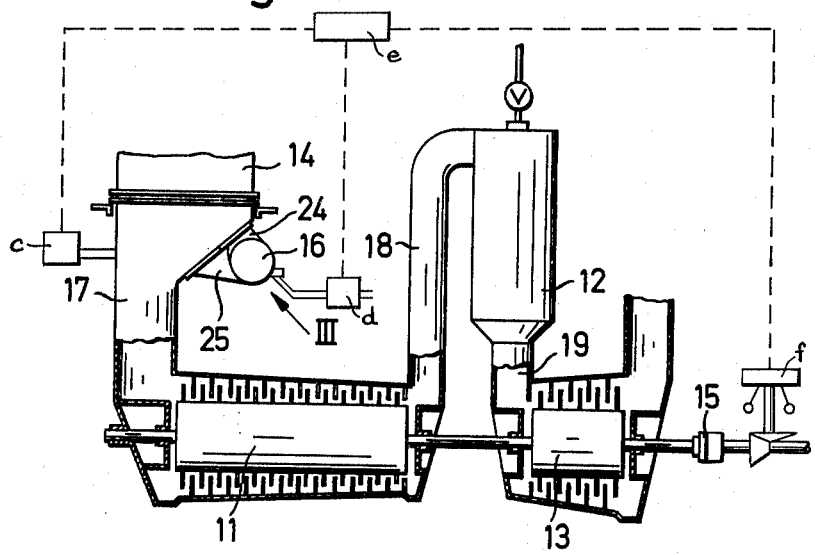
FIG. 2 illustrates a view of another turbomachine according to the invention having two turbomachines set one following the other.
Figure 3:
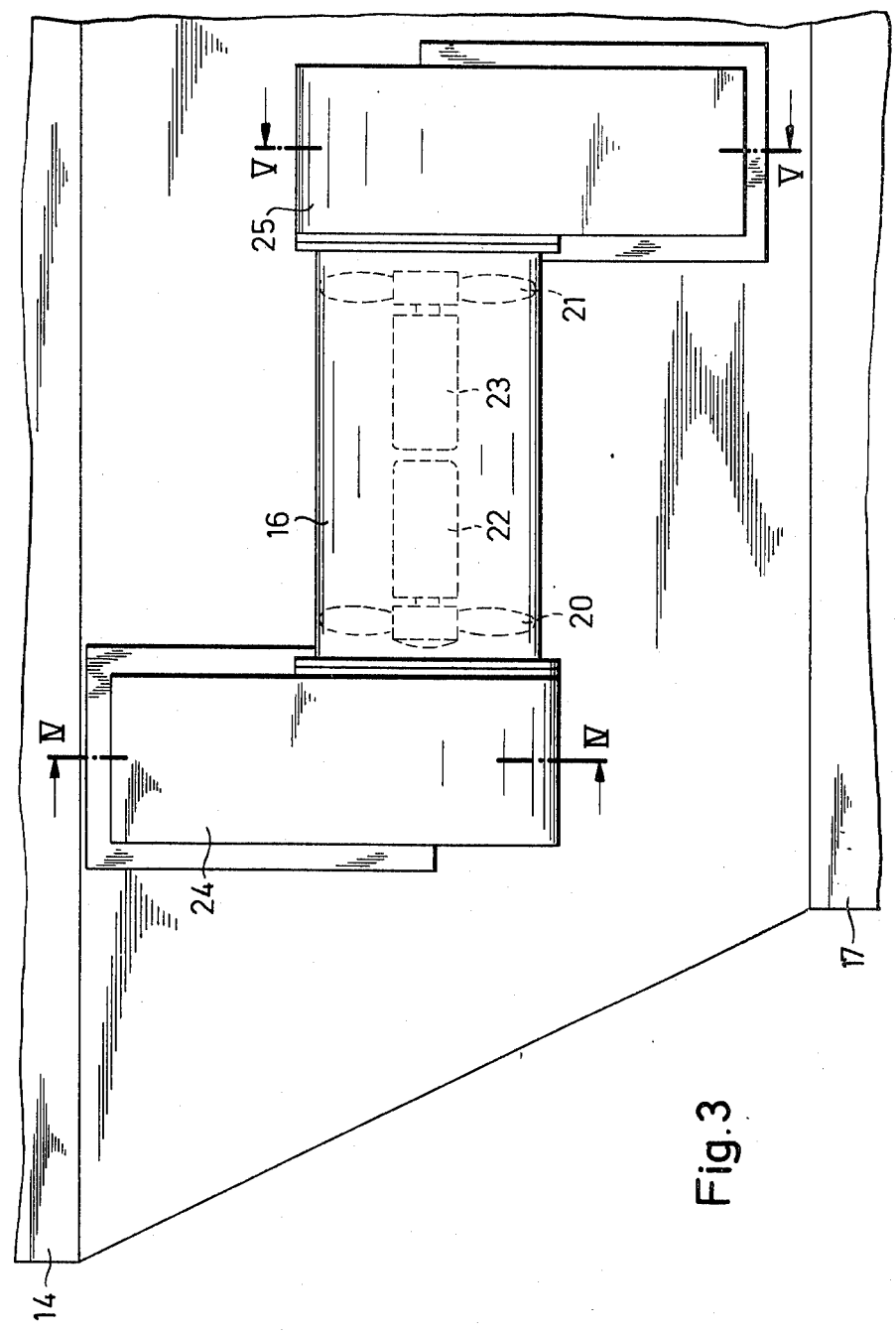
FIG. 3 illustrates a view of an auxiliary blower taken in the direction of arrow III of FIG. 2.

Referring to FIGS. 2 and 3, the auxiliary blower 16 is constructed with two stages 20 and 21, each of which has an axially-bladed rotor driven by electromotors 22 and 23, respectively. In addition, a conduit 24 of a by-pass duct is connected to the supply line 14 to receive air for the blower 16. The blower 16 also communicates via a conduit 25 with the duct 17 following the supply line 14 in order to force the received air into the duct 17 under pressure.

As shown in FIG. 2, the sensing and switching means includes a tachometer $f$ which measures the speed of the rotors of the turbomachines 11, 13 and, when the rotors reach the speed region suitable for cooling, emits a signal to a control means $e$ of known construction. The control means, in turn, delivers a signal switch $d$ to activate the blower 16 and a signal to the means $c$ for moving the shut-off means (not shown) into a closed position.

Figure 4:
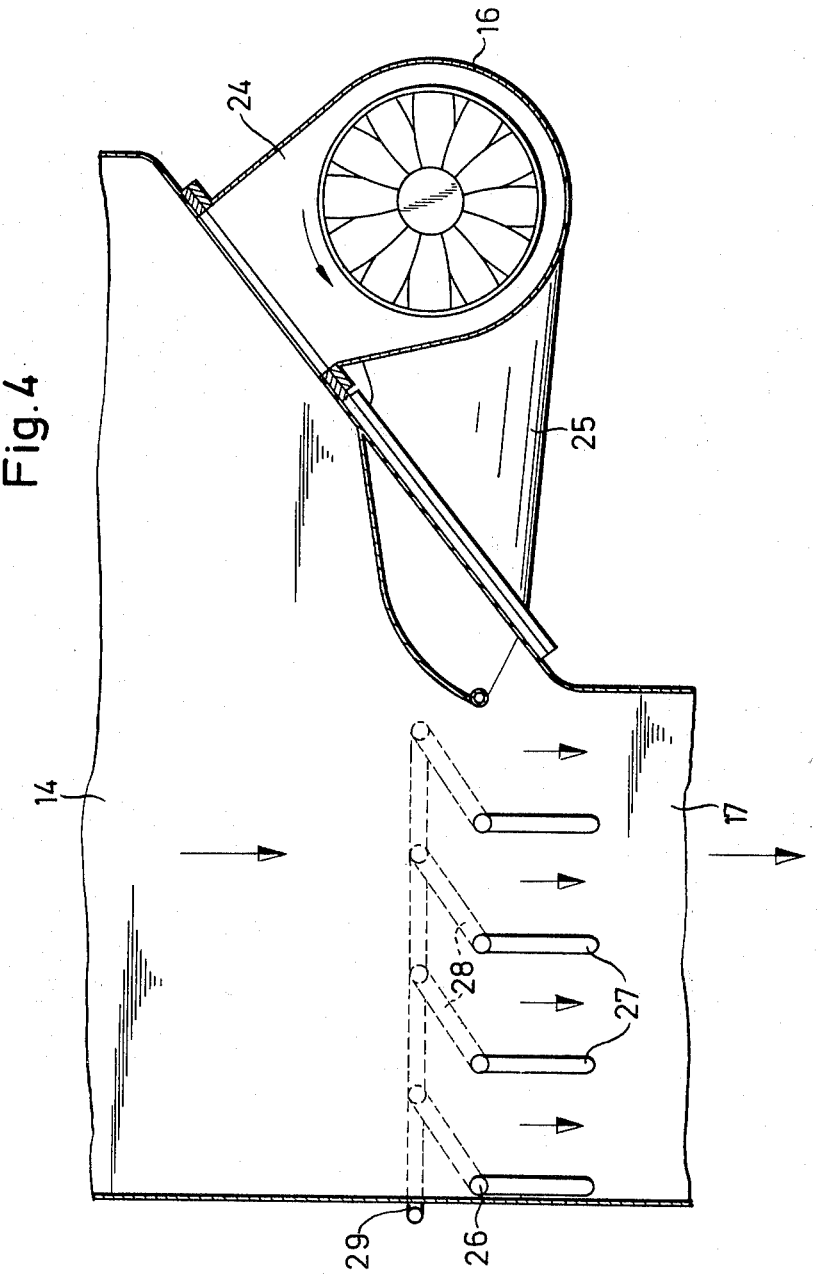
FIG. 4 illustrates a view taken along the line IV—IV of FIG. 3.
Figure 5:
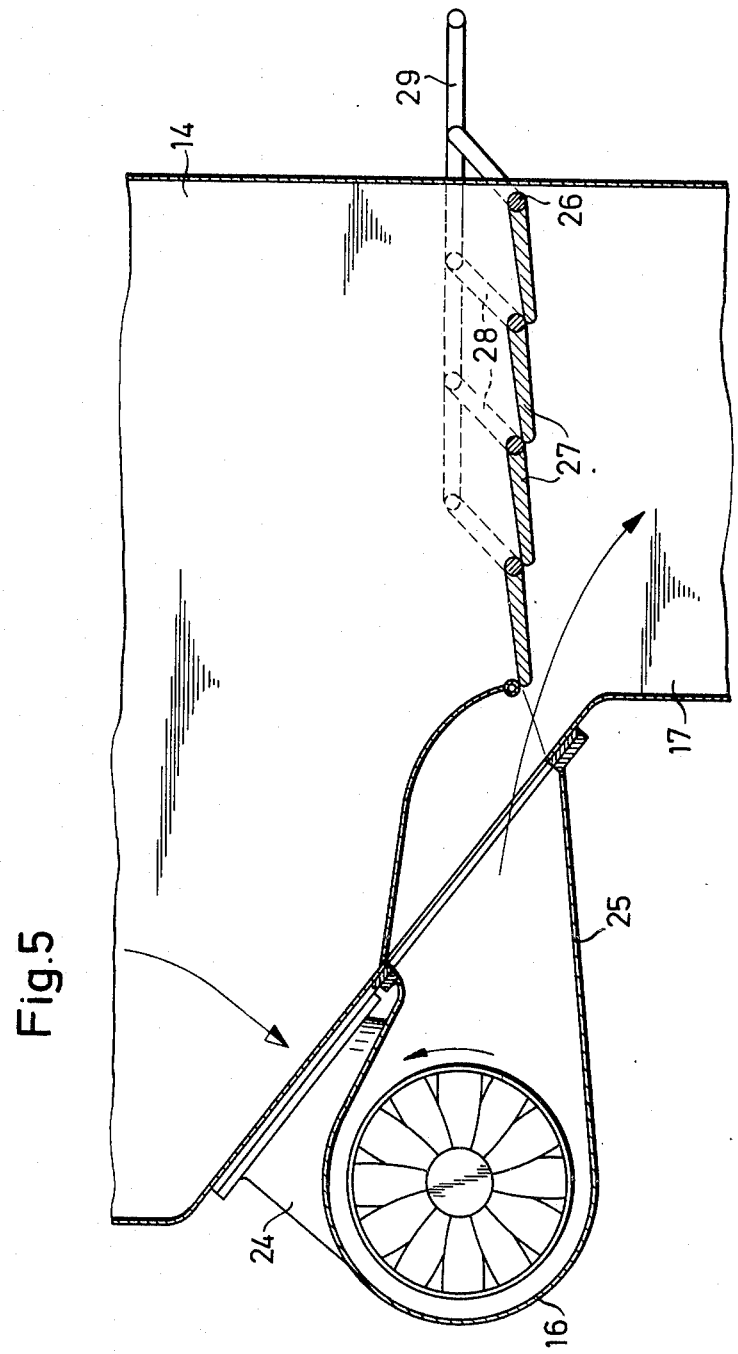
FIG. 5 illustrates a view taken along the line V—V of FIG. 3 in the shut-off position.

Referring to FIGS. 4 and 5, in order to prevent a short-circuit flow, a shut-off means 26 is disposed between the connections of the line 14 and duct 17. This shut-off means 26 resembles a shutter or Venetian blind and consists of four shutter-like slats or flaps 27 which can, by means of the levers 28 and a rod system 29, be pivoted into the open position of FIG. 4 or into the closed position of FIG. 5. During operation of the turbomachines 11 and 13 by compressed air, the flaps 27 are set in the position of FIG. 5; and during normal useful operation, are set in the position of FIG. 4. During maintenance of the reduced cooling speed, the rotors of the turbomachines — are in particular the rotor of the gas turbine which is highly heated due to useful operation — are cooled symmetrically, so that no one-sided temperature differences can occur over a cross-section. As a result, the rotors do not become warped on their longitudinal axis. If the cooling speed is selected high enough, then the stators are also cooled uniformly over a cross-section. In this case, the stators are spared from an impairing warping. Finally, the combustion chamber is cooled at the same time in such a way that no stored heat can produce warping, particularly when the turbines are restarted.

Instead of using air for the gaseous medium blown into the compressors, use may be made of a low-oxygen gas, e.g. an exhaust gas from an outside source, or some other inert gas.

What is claimed is:

1. A method of cooling a turbomachine having at least one axial turbocompressor including a rotor and a plurality of vanes within a flow path through the turbocompressor, said method comprising the step of blowing a flow of pressurized gaseous medium into the turbocompressor for flow through said flow path during shut-down of said turbocompressor in response to said rotor slowing to a reduced speed to maintain said rotor at said reduced speed until said rotor has cooled to a predetermined temperature.

2. A method as set forth in claim 1 wherein said rotor slows to said reduced speed under the inherent kinetic energy therein.

3. In a turbomachine having at least one axial turbocompressor including a rotor for operation at high temperature and a plurality of vanes within a flow path through said turbocompressor, and a supply line for delivering a gaseous medium to said flow path;

an auxiliary blower connected with said supply line to deliver a flow of pressurized gaseous medium to said flow path for driving said rotor during stopping of said rotor to effect a uniform cooling of said rotor and said vanes, and means for sensing the speed of said rotor, said means being connected to said blower to activate said blower in response to said rotor falling from an operating speed to a lower predetermined speed.

4. In a turbomachine having at least one axial turbocompressor including a rotor for operation at high temperature and a plurality of vanes within a flow path through said turbocompressor, and a supply line for delivering a gaseous medium to said flow path;

a shut-off means disposed in said supply line to close said supply line with respect to said turbocompressor, a duct connected to said supply line downstream of said shut-off means and an auxiliary blower in said duct connected with said supply line to deliver a flow of pressurized gaseous medium to said flow path for driving said rotor at reduced speed after closing said shut-off means to effect a uniform cooling of said rotor and said vanes, said duct being connected to said supply line upstream of said shut-off means to by-pass gaseous medium around said shut-off means and through said auxiliary blower after said closing of said shut-off means.

5. A method as set forth in claim 1 wherein said flow of pressurized gaseous medium is blown into the turbocompressor under a drive power of 0.05% to 0.1% of the useful power in the full-load operation of the turbocompressor.

6. A method of cooling a turbomachine having at least one axial turbocompressor including a rotor and a plurality of vanes within a flow path through the turbocompressor, said method comprising the steps of interrupting the power driving the turbocompressor and reducing the rotor speed by absorbing the inherent kinetic energy until the speed falls in the region suitable for cooling and passing a flow of gaseous medium pressurized by an auxiliary blower through said flow path for driving the compressor at said cooling speed until said rotor has cooled to the predetermined temperature.

7. In a turbomachine having at least one axial turbocompressor including a rotor for operation at high temperature and a plurality of vanes within a flow path through said turbocompressor, and a supply line for delivering a gaseous medium to said flow path;

a shut-off means disposed in said supply line to close said supply line with respect to said turbocompressor, a duct connected directly and solely to said supply line downstream of said shut-off means and an auxiliary blower in said duct connected with said supply line to deliver a flow of pressurized gaseous medium to said flow path for driving said rotor at reduced speed after closing said shut-off means to effect a uniform cooling of said rotor and said vanes, said duct being uninterrupted between said blower and said supply line to deliver the total flow of pressurized gaseous medium from said blower to said supply line.

8. In a turbomachine as set forth in claim 7, a combustion chamber connected to said compressor to receive a flow of gaseous medium therefrom and a gas turbine connected to said combustion chamber to receive a gaseous medium therefrom, said gas turbine having a rotor coupled to said compressor rotor.

* * * * *